(12) United States Patent
Brock et al.

(10) Patent No.: US 7,475,823 B2
(45) Date of Patent: Jan. 13, 2009

(54) HAND HELD BAR CODE READER WITH IMPROVED IMAGE CAPTURE

(75) Inventors: Christopher Brock, Manorville, NY (US); Thomas Lackemann, Syaville, NY (US); Robert James Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1 day.

(21) Appl. No.: 11/441,727

(22) Filed: May 26, 2006

(65) Prior Publication Data

US 2007/0272756 A1 Nov. 29, 2007

(51) Int. Cl.
G02B 26/10 (2006.01)
(52) U.S. Cl. .................. 235/462.25; 235/462.06; 235/462.14; 235/462.24; 235/472.01; 235/462.29
(58) Field of Classification Search ............ 235/462.25, 235/462.06, 462.14, 462.24, 472, 454, 462.2, 235/462.26, 462.29, 472.01
See application file for complete search history.

(56) References Cited

U.S. PATENT DOCUMENTS

| | | | | |
|---|---|---|---|---|
| 5,550,366 A | * | 8/1996 | Roustaei | 235/462.34 |
| 5,949,052 A | * | 9/1999 | Longacre et al. | 235/462.08 |
| 6,109,528 A | * | 8/2000 | Kunert et al. | 235/472.01 |
| 6,549,239 B1 | * | 4/2003 | Tao | 348/371 |
| 6,729,546 B2 | * | 5/2004 | Roustaei | 235/462.45 |
| 6,827,268 B2 | * | 12/2004 | Ishii et al. | 235/462.25 |
| 2005/0156028 A1 | * | 7/2005 | Chirnomas | 235/381 |
| 2005/0206078 A1 | * | 9/2005 | Soltys et al. | 273/149 R |

* cited by examiner

Primary Examiner—Le Thien Minh
Assistant Examiner—Tuyen K Vo
(74) Attorney, Agent, or Firm—Tarolli, Sundheim, Covell & Tummino LLP

(57) ABSTRACT

An imaging-based bar code reader that includes an imaging and decoding system. When used on a stand to image documents, typically neither the stand or document is moving. Therefore blurring due to motion is not an issue. A sensor detects when the scanner is mounted to a stand. When commanded to take an image the scanner electronics and software modifies an auto-exposure process to minimize gain and lengthen exposure. This modification results in the scanner that is effective for scanning bar codes and yet also takes excellent pictures when mounted to a stand.

6 Claims, 4 Drawing Sheets

HAND HELD BAR CODE READER WITH IMPROVED IMAGE CAPTURE

FIELD OF THE INVENTION

The present invention relates to an imaging-based bar code reader and, more particularly, to a bar code reader that facilitates capturing images.

BACKGROUND OF THE INVENTION

Various electro-optical systems have been developed for reading optical indicia, such as bar codes. A bar code is a coded pattern of graphical indicia comprised of a series of bars and spaces having differing light reflecting characteristics. The pattern of the bars and spaces encode information. In certain bar codes, there is a single row of bars and spaces, typically of varying widths. Such bar codes are referred to as one dimensional (1D) bar codes. Other bar codes include multiple rows of bars and spaces, each row typically having the same width. Such bar codes are referred to as two dimensional (2D) bar codes and examples include PDF417 and DataMatrix bar code formats. By virtue of the use of multiple rows of features (bars and spaces), 2D bar codes typically allow more encoded information than a 1D bar code in a given bar code area. Devices that read and decode one and two dimensional bar codes utilizing imaging systems that image and decode imaged bar codes are typically referred to as imaging-based bar code readers or bar code scanners.

Imaging systems include charge coupled device (CCD) arrays, complementary metal oxide semiconductor (CMOS) arrays, or other imaging pixel arrays having a plurality of photosensitive elements or pixels. An illumination system comprising light emitting diodes (LEDs) or other light source directs illumination toward a target object, e.g., a target bar code. Light reflected from the target bar code is focused through a lens of the imaging system onto the pixel array. Thus, an image of a field of view of the focusing lens is focused on the pixel array. Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals and decodes the imaged bar code.

In an image based scanner it is helpful to the decoding performance to minimize blur in the image. Because the scanner of the item being scanned or both are potentially in motion, a minimum exposure time is used to minimize blur. On a CMOS sensor, lowering exposure time for high pixel count imagers increases the gain used on the sensor electronics when sampling pixels. This high gain introduces noise and aberrations noticeable to the eye in the image. This is acceptable for a barcode decoder, but degrades the image when using the device as a camera.

SUMMARY OF THE INVENTION

An imaging-based bar code reader that includes an imaging and decoding system. When used on a stand to image documents, typically neither the stand or document is moving. Therefore blurring due to motion is not a problem. A sensor detects when the scanner is mounted to a stand. When commanded to take an image the scanner electronics and software modifies an auto-exposure process to minimize gain and lengthen exposure. This modification results in a scanner that is effective for scanning bar codes and yet also takes excellent pictures when mounted to a stand.

An imaging-based reader in one exemplary embodiment includes an imaging and decoding system for imaging a target image and if present decoding a target bar code. The imaging and decoding system has focusing optics and a sensor array. The focusing optics defines a field of view and focuses reflected illumination from an image onto the sensor array. A sensor determines if the reader is stationary with respect to the target and if it is, the imaging and decoding system responds to the sensor by adjusting the exposure period to reduce image distortion or noise.

These and other objects, advantages, and features of the exemplary embodiment of the invention are described in detail in conjunction with the accompanying drawings.

DETAILED DESCRIPTION

Figure 3:
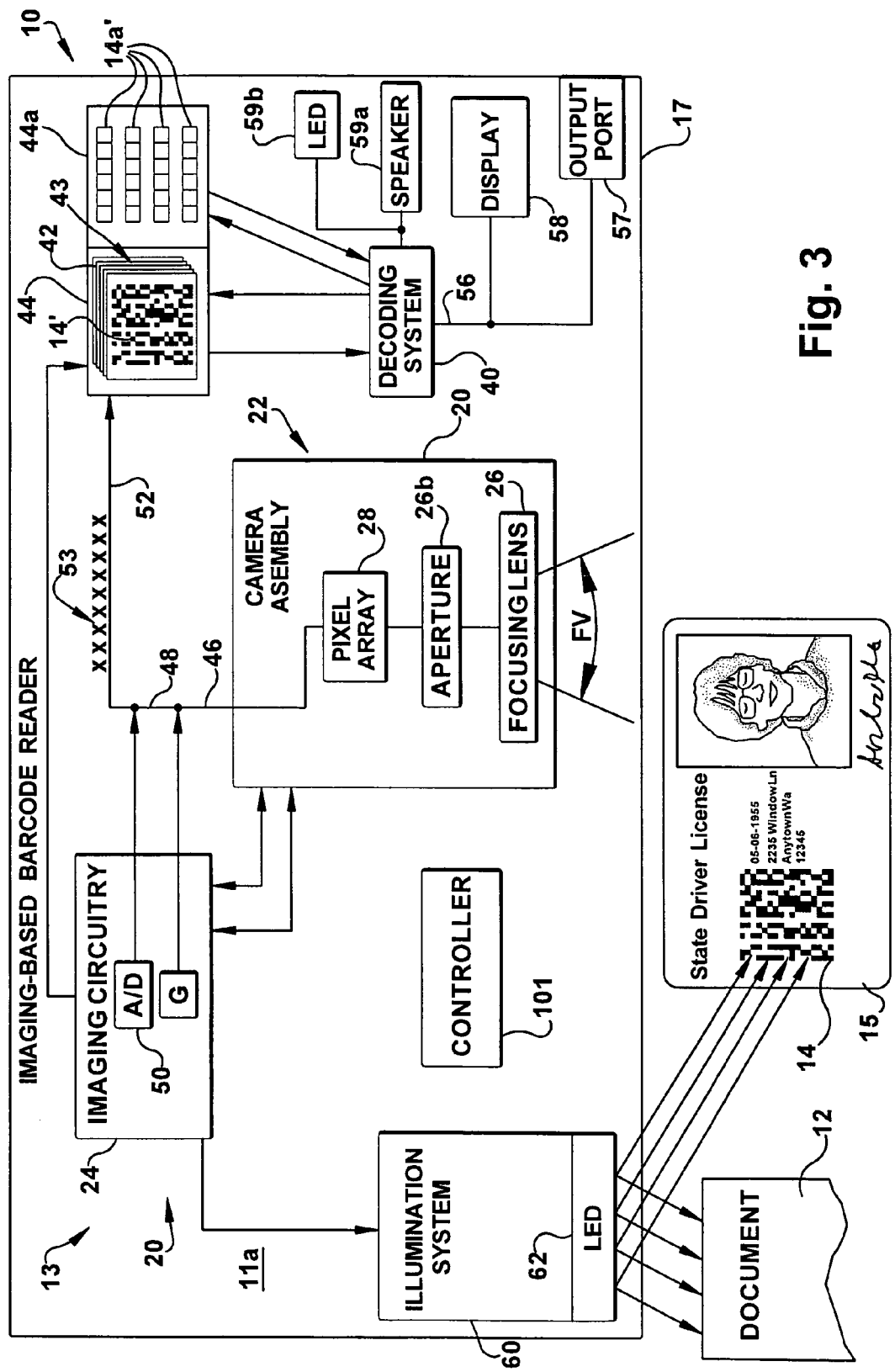
FIG. 3 is a block circuit diagram of the imaging-based bar code reader of FIG. 1.

An imaging-based scanner that is capable of reading bar codes is shown schematically at 10 in the Figures. The scanner 10 is capable of imaging and decoding bar codes, such as a 2D bar code shown at 14 in FIG. 3. Additionally, the reader 10 is also capable of capturing images such as an image or a document 12 in FIG. 3 that contains signatures, graphics or the like. The bar code reader 10 includes a housing 11 supporting an imaging system 20 and a decoding system 40 (FIG. 3). The housing 11 supports a transparent window 17 through which reflected illumination from the target bar code 14 is received by the imaging system 20.

When enabled, the imaging system 20 captures an image frame 42 of a field of view FV of the imaging system. If imaging a target bar code 14, the imaging process captures a series of image frames 43 (FIG. 3) as the target bar code 14 moves through the imaging system field of view FV. Each of the series of captured image frames 43 includes at least a portion of an image 14' of the target bar code. The decoding system 40 sequentially analyzes each image frame 42 of the series of image frames 43 and attempts to decode decodable portions of the imaged bar code 14'. The decoded portions 14a' of the imaged bar code 14' are stored in a buffer memory 44a.

Utilizing a sequence stitching method, each time a decoded portion 14a' is stored in the buffer memory 44a, the decoding system 40 attempts to combine or stitch the decoded portions 14a' stored in buffer memory to achieve a full decode of the target bar code 14. The sequential analysis, partial decoding and stitching of decoded portions of the imaged bar code 14' continues until a full decode of the target bar code 14 is achieved. One exemplary reader 10 includes an item guide which directs movement of an item 15 to which the target bar code 14 is affixed such that the target bar code moves through the field of view FV along a linear travel path. Additional details of the stitching method are disclosed in co-pending application Ser. No. 11/395,569 filed Mar. 31, 2006 which is owned by the assignee of the present application and is incorporated herein by reference.

Figure 2:
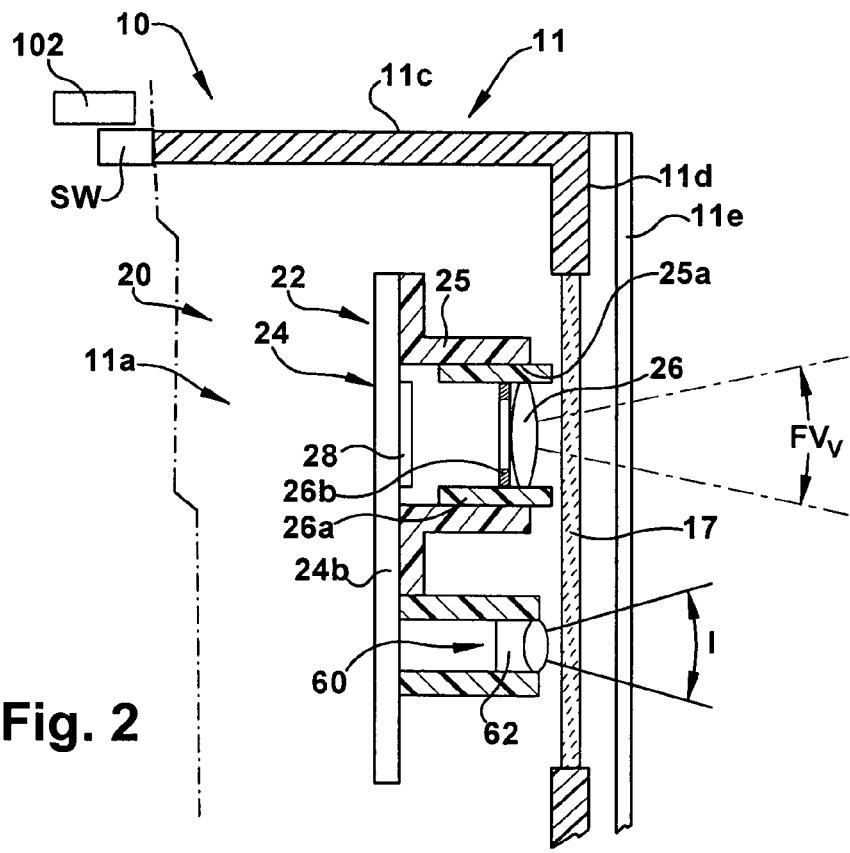
FIG. 2 is a schematic sectional view of a portion of the imaging-based bar code reader showing the scanner head.

As depicted in FIG. 2, the imaging system 20 includes an imaging camera 22 and associated imaging circuitry 24. The imaging camera 22 includes a housing supporting focusing optics including a focusing lens 26 and a 2D photosensor or pixel array 28. The imaging camera 22 is enabled during an imaging session to capture a sequence of images of the field of view FV of the focusing lens 26. A subset of the sequence of captured images will define the series of images 42 that include a full or partial image 14' of the target bar code 14. Since only captured images that include at least a portion of an image of the target bar code 14 are useful for decoding the target bar code, captured images not including any portion of the target bar code are ignored.

Figure 1:
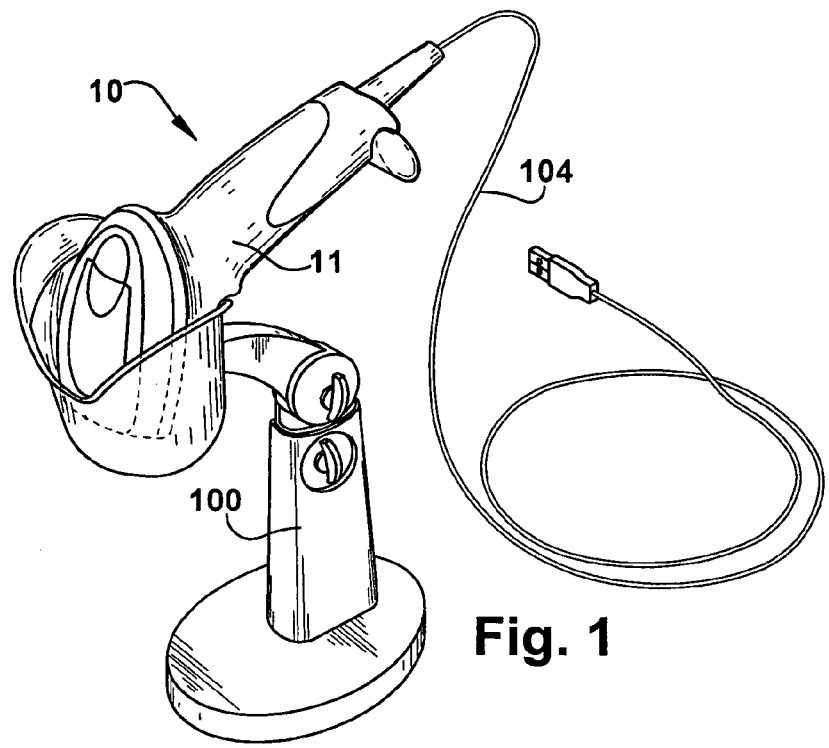
FIG. 1 is a perspective view of a bar code scanner supported on a stationary stand.

In one mode of operation, the bar code reader 10 is a hands-free reader including a generally upright housing 11 having a flat base portion that can be placed on a counter or tabletop. The scanner 10 of FIG. 1 is supported by a support stand 100. When so mounted, the exposure operation mode of the camera can be altered as described more completely below to enhance the image quality of the resulting image produced by the scanner 10.

As is best seen in FIG. 2, the housing 11 defines the interior area 11a. Disposed within the interior area 11a circuitry 13 including the imaging and decoding systems 20, 40 and an illumination assembly 60 which, when enabled, directs illumination through the transparent window 17 and onto a target. The bar code reader circuitry 13 is electrically coupled to a power supply, which may be in the form of an on-board battery or a connected off-board power supply. If powered by an on-board battery, the reader 10 may be a stand-alone, portable unit. If powered by an off-board power supply, the reader 10 may have some or all of the reader's functionality provided by a connected host device.

Circuitry associated with the imaging and decoding systems 20, 40, including the imaging circuitry 24, may be embodied in hardware, software, firmware, electrical circuitry or any combination thereof and may be disposed within, partially within, or external to the camera assembly housing 25. The imaging camera housing 25 is supported with an upper or scanning head portion 11c of the housing and receives reflected illumination from the target bar code 14 through the transparent window 17 supported by the scanning head 11c. The focusing lens 26 is supported by a lens holder 26a. The camera housing 25 defines a front opening 25a that supports and seals against the lens holder 26a so that the only illumination incident upon the sensor array 28 is illumination passing through the focusing lens 26.

Depending on the specifics of the camera assembly 22, the lens holder 26a may slide in and out within the camera housing front opening 25a to allow dual focusing under the control of the imaging circuitry 24 or the lens holder 26a may be fixed with respect to the camera housing 25 in a fixed focus camera assembly. The lens holder 26a is typically made of metal. A back end of the housing 25 may be comprised of a printed circuit board 24b, which forms part of the imaging circuitry 24 and may extend beyond the housing 25 to support the illumination system 60.

The imaging system 20 includes the sensor array 28 which may comprise a charged coupled device (CCD), a complementary metal oxide semiconductor (CMOS), or other imaging pixel array, operating under the control of the imaging circuitry 24. In one exemplary embodiment, the pixel array 28 comprises a two dimensional (2D) mega pixel array with a typical size of the pixel array being on the order of 1280×1024 pixels. The pixel array 28 is secured to the printed circuit board 24b, in parallel direction for stability.

As is best seen in FIG. 2, the focusing lens 26 focuses light reflected from the target bar code 14 through an aperture 26b onto the pixel/photosensor array 28. Thus, the focusing lens 26 focuses an image of the target bar code 14 (assuming it is within the field of view FV) onto the array of pixels comprising the pixel array 28. The focusing lens 26 field of view FV includes both a horizontal and a vertical field of view, the vertical field of view being shown schematically as $FV_V$ in FIG. 1.

During an imaging session, multiple images of the field of view FV of the reader 10 may be obtained by the imaging system 20. An imaging session may be instituted 110 by an operator, for example, pressing a trigger to institute an imaging session Alternately, the imaging system 20 may institute an imaging session when the item 15 begins moving through the field of view FV. Yet another alternative is to have the imaging system 20 always operational such that image after image is captured and analyzed for the presence of at least a part or portion of an imaged target bar code 14'. In any event, the process of capturing an image 42 of the field of view FV during an imaging session is known in the scanner art. Electrical signals are generated by reading out of some or all of the pixels of the pixel array 28 after an exposure period. After the exposure time has elapsed, some or all of the pixels of pixel array 28 are successively read out, thereby generating an analog signal 46. In some sensors, particularly CMOS sensors, all pixels of the pixel array 28 are not exposed at the same time, thus, reading out of some pixels may coincide in time with an exposure period for some other pixels.

The analog image signal 46 represents a sequence of photosensor voltage values, the magnitude of each value representing an intensity of the reflected light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255 (for an eight bit processor, i.e., $2^8=256$), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

Mounted to the housing 11 is a reed switch SW. The reed switch SW is positioned within the housing such that when the housing 11 is supported by the stand 100 an appropriately positioned permanent magnet 102 attached to the stand causes the reed switch SW to change state and signal the scanner 10 to alter the exposure mode of the scanner. A typical reed switch includes conductive contacts that are bridged by a metallic conductor in either the absence or presence of a magnetic field.

Figure 4:
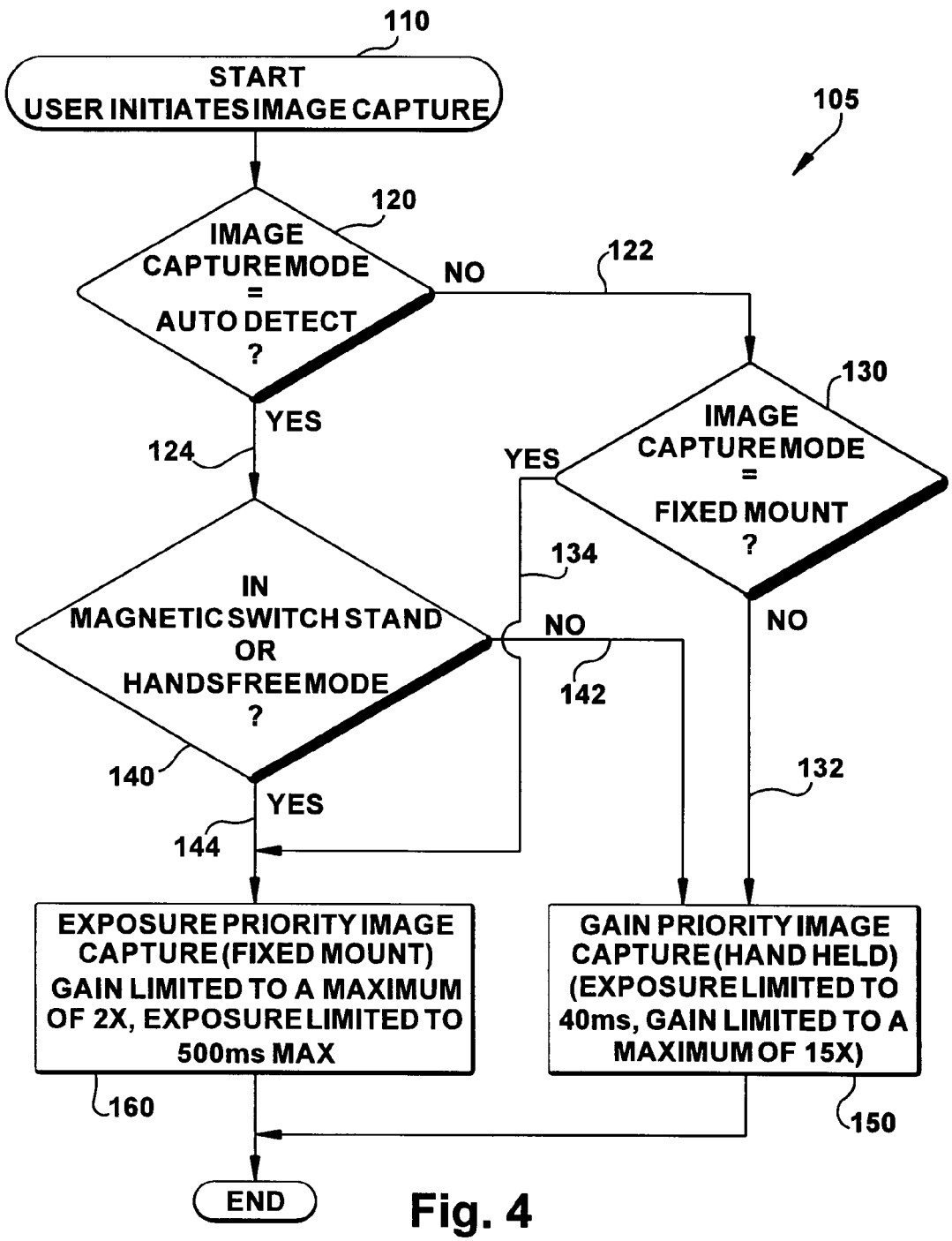
FIG. 4 as a flow chart of an image capture process.

FIG. 4 is a flow chart of the process performed by a controller 101 for determining and controlling an exposure mode of the scanner 10. The controller 101 includes a microprocessor within the camera assembly 22 executing software which responds to a user initiated capture 110 by determining 120 whether the scanner has been placed in an auto detect mode. In this context, autodetect means whether the state of the reed switch SW is checked to determine whether the scanner is mounted to the stand. Assume that a "no" branch 122 is taken by the software. A test is made 130 to determine whether even though not mounted in the stand, it is desirable to have the scanner operate in a fixed mount mode. This may occur when for example, though not mounted in the stand 100, the housing is resting on a flat surface. This mode can be controlled by the software in response to a command from an external source by means of a serial communications connection 104 coupled to an external computer (not shown). Alternatively the software could switch to fixed mount mode based on a scanned image such a specific bar code scanned image. The controller could also lengthen an exposure time of a subsequent image based on multiple images of a target if a determination is made that the target is stationary with respect to the reader.

If the scanner is not commanded to enter its fixed mount mode of image capture, a "no" branch 132 is taken and image capture occurs 150 in a way that minimizes blur in the resulting image due to constraints on exposure time (40 ms maximum exposure for example).

In this mode, the scanner 10 is probably scanning for a bar code such as the bar code 14. The digitized gray scale values 53 of the digitized signal 52 are stored in the memory 44. The digital values 53 corresponding to a read out of the pixel array 28 constitute the image frame 42, which is representative of the image projected by the focusing lens 26 onto the pixel array 28 during an exposure period. If the field of view FV of the focusing lens 26 includes a target bar code 14, then a digital gray scale value image 14' of the target bar code 14 would be present in the image frame 42.

The decoding circuitry 40 operates on the digitized gray scale values 53 of the image frame 42 and attempts to decode any decodable part or portion of that image frame 42 that is representative of a part or portion the imaged target bar code 14'. The decoded portions 14a' of the imaged target bar code' are stored in the buffer memory 44a.

If the decoding is successful, decoded data 56, representative of the data/information coded in the bar code 14 is then output via a data output port 57 to a conductor 104 for serial signals and/or displayed to a user of the reader 10 via a display 58. Upon achieving a good "read" of the bar code 14, that is, the bar code 14 was successfully imaged and decoded, a speaker 59a and/or an indicator LED 59b is activated by the bar code reader circuitry 13 to indicate to the user that the target bar code 14 has successfully read, that is, the target bar code 14 has been successfully imaged and the imaged bar code 14' has been successfully decoded.

Returning to the flow chart of FIG. 4, assume the software takes the "yes" branch 124 corresponding to the scanner being in autodetect mode. The software tests 140 to determine the state of the reed switch SW and thereby determines whether the scanner 10 is mounted to the stand 100 or is in hands free mode. If the scanner 10 is not in the stand 100 a "no" branch is taken 142 and the gain priority image capture mode is performed 150.

If the scanner 10 is mounted in the stand 100, the software branches 144 to a so called exposure priority mode 160. Blurring due to motion is not a problem. The scanner electronics and software modifies the exposure process to minimize gain (2 times the image sensor output (3 db)) and lengthen exposure to a maximum of 500 milliseconds or one half second. Limiting the gain to 3 db is illustrative and in an alternate embodiment the ceiling of gain is based on the noise sensitivity of the imaging electronics. The software control results in a scanner that is effective for scanning bar codes and yet also takes excellent pictures when mounted to the stand 100.

Figure 5:
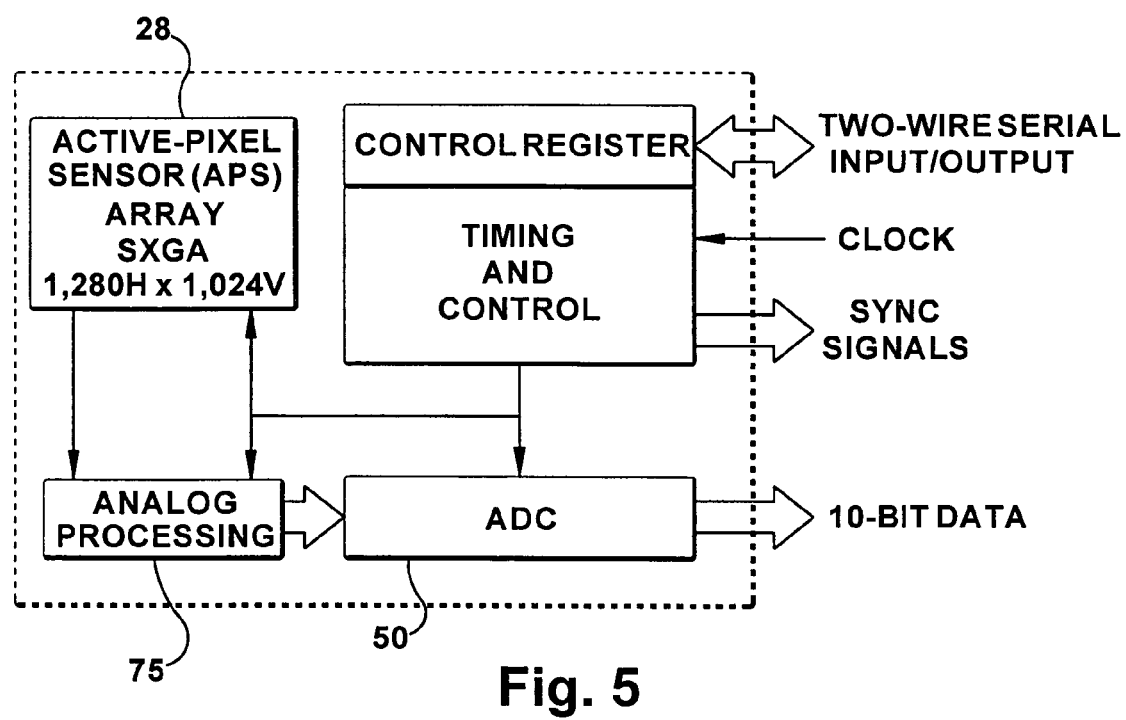
FIG. 5 is a block diagram of a representative circuit for capturing images in a hand held scanner.

In the exemplary embodiment the scanner includes a Micron MT9M001, one half inch Megapixel Digital Image Sensor. This is a representative sensor have a block diagram depicted in FIG. 5. The Sensor includes a control register which communicates with a serial control bus. The control register is adjusted to adjust the manner in which the contents of the sensor array 28 are accessed. In particular, the contents of the control register indicate the sets of amplifiers or gain adjustments produced at the output of the array 28 by an analog processing circuit 75 integral with the image sensor. Gain is reduced for long exposures and hence producing less distortion and noise in the output signals output at the ten bit output from the sensor's A/D converter 50.

The bar code reader 10 further includes the illumination assembly 60 for directing illumination to illuminate the target bar code 14 along the field of view FV. The illumination assembly 60 and the aiming apparatus 70 operate under the control of the imaging circuitry 24. In one preferred embodiment, the illumination assembly 60 is a single LED 62 producing a wide illumination angle to completely illuminate the target bar code 14.

The LED 62 is supported within the scanning head 11b just behind the transparent window 17 and face forwardly, that is, toward the target bar code 14. The LED 62 is positioned away from the focusing lens 26 to increase the illumination angle (shown schematically as I in FIG. 3) produced by the LED 62. Preferably, the illumination provided by the illumination assembly 60 is intermittent or flash illumination as opposed to continuously on illumination to save on power consumption. Also, preferably, the LED 62 is red at the higher end of the red wavelength range, e.g., approximate wavelength around 670 nanometers (nm.), since red LEDs of this wavelength have been found to provide for efficient conversion of electrons to photons by the LEDs and from photons back to electrons by the photosensor array 28.

Imaging and Decoding Process

The steps of the imaging and decoding process are show generally at 105 in the flow chart of FIG. 4. A reading session is commenced to read the target bar code 14 at 110. At step 110, utilizing the imaging system 10, an image frame 42 is captured by reading out the pixel array 28 after an exposure time to generate the analog signal 46 and the analog signal is digitized and digital gray scale values 53 are generated and stored in memory 44. This process continuously repeats during the entirety of the imaging session storing a sequence of captured images in the memory 44.

A bar code sequence stitching method utilizing a buffer memory is disclosed in U.S. Pat. No. 5,821,519, which issued on Oct. 13, 1998 to Lee and Spitz and which is assigned to the assignee of the present invention. The '519 patent is incorporated herein in its entirety by reference. Another reference disclosing sequence stitching methodologies is a book entitled *Algorithms on Strings, Trees, and Sequences: Computer Science and Computational Biology*, by Dan Gusfield, published by the Press Syndicate of the University of Cambridge, Cambridge, England, copyright 1997, ISBN 0-521-58519-8 (hc). The aforementioned book is incorporated herein in its entirety by reference.

While the present invention has been described with a degree of particularity, it is the intent that the invention includes all modifications and alterations from the disclosed design falling within the spirit or scope of the appended claims.

We claim:

1. An imaging-based portable reader for reading a target comprising:
   a) an imaging and decoding system for imaging a target image and if present decoding a target bar code, the imaging and decoding system including focusing optics and a sensor array, the focusing optics defining a field of view and focusing reflected illumination from an image onto the sensor array; and b) a monitor for determining if the portable reader is stationary, in a fixed mount mode, or moving with respect to the target, and said imaging and decoding system responds to the monitor by adjusting an exposure period in situations wherein said portable reader is stationary, in a fixed mount mode, or moving with respect to the target such that a first exposure period is provided when said monitor determines that the portable reader is in one of a stationary and fixed mount mode and a second exposure period when said monitor determines that said portable reader is moving, the second exposure period being shorter in duration than said first exposure period to reduce image distortion and/or noise.

2. The imaging-based portable reader of claim 1 wherein the monitor is a combination of a reed switch connected to one of a said reader and a stand for supporting the reader and a magnet connected to the other of said reader and said stand.

3. The imaging-based portable reader of claim 1 wherein said monitor comprises a switch for sensing a presence of a magnet in either a stand for the housing or a housing body.

4. For use with a portable image reader that reads images an apparatus comprising:

a controller executing software for adjusting exposure capture times and signal gain from an imaging circuit during capture of images; and a monitor for determining a first exposure mode and communicating said first exposure mode to the controller in situations where blurring of images is not of concern due to a fixed relation between the portable image reader and the image and said monitor for determining a second exposure mode and communicating said second exposure mode to the controller in situations where blurring of images is of concern due to a moving relation between the portable image reader and the image, said second exposure mode being shorter in duration than said first exposure mode to reduce image distortion and/or noise.

5. The apparatus of claim 4 wherein said monitor comprises a switch for sensing a presence of a magnet in either a stand for the housing or a housing body.

6. The imaging-based portable reader of claim 4 wherein the monitor is a combination of a reed switch connected to one of a said reader and a stand for supporting the reader and a magnet connected to the other of said reader and said stand.

* * * * *

UNITED STATES PATENT AND TRADEMARK OFFICE
CERTIFICATE OF CORRECTION

PATENT NO.         : 7,475,823 B2
APPLICATION NO. : 11/441727
DATED              : January 13, 2009
INVENTOR(S)        : Brock et al.

Page 1 of 1

It is certified that error appears in the above-identified patent and that said Letters Patent is hereby corrected as shown below:

ON THE TITLE PAGE

Item (75), under "Inventors", Line 2, delete "Thomas Lackemann," and insert -- Thomas E. Lackemann, --, therefor.

In Column 4, Line 16, delete "session" and insert -- session. --, therefor.

Signed and Sealed this

Twenty-fourth Day of November, 2009

David J. Kappos
*Director of the United States Patent and Trademark Office*